(12) United States Patent
Marbach et al.

(10) Patent No.: US 7,181,487 B1
(45) Date of Patent: Feb. 20, 2007

(54) METHOD AND SYSTEM FOR TRANSMITTING AND ACTIVATING AN APPLICATION REQUESTING HUMAN INTERVENTION IN AN AUTOMATION NETWORK

(75) Inventors: Alain Marbach, Belmont, MA (US); Rainer H. Wischinski, Sandown, NH (US); Richard A. Baker, West Newbury, MA (US); Charles J. Klindt, Windham, NH (US)

(73) Assignee: Schneider Automation Inc., North Andover, MA (US)

( * ) Notice: Subject to any disclaimer, the term of this patent is extended or adjusted under 35 U.S.C. 154(b) by 668 days.

(21) Appl. No.: 09/611,996

(22) Filed: Jul. 7, 2000

(51) Int. Cl.
*G06F 15/16* (2006.01)
*G06F 15/173* (2006.01)

(52) U.S. Cl. ............... 709/200; 709/202; 709/208; 709/224; 709/250; 719/318

(58) Field of Classification Search ........ 709/200–203, 709/208, 217, 230, 223–224, 227–229, 238, 709/245, 250; 719/318, 320
See application file for complete search history.

(56) References Cited

U.S. PATENT DOCUMENTS

| | | | |
|---|---|---|---|
| 3,971,000 A | 7/1976 | Cromwell | |
| 4,251,858 A | 2/1981 | Cambigue et al. | |
| 4,319,338 A | 3/1982 | Grudowski et al. | |
| 4,688,167 A | 8/1987 | Agarwal | |
| 4,701,845 A | 10/1987 | Andreasen et al. | |
| 4,845,644 A | 7/1989 | Anthias et al. | |
| 4,858,152 A | 8/1989 | Estes | |
| 4,897,777 A | 1/1990 | Janke et al. | |
| 4,912,623 A | 3/1990 | Rantala et al. | |
| 4,937,777 A | 6/1990 | Flood et al. | |
| 4,949,274 A | 8/1990 | Hollander et al. | |
| 4,953,074 A | 8/1990 | Kametani et al. | |
| 4,974,151 A | 11/1990 | Advani et al. | |
| 4,979,107 A | 12/1990 | Advani et al. | |
| 4,992,926 A | 2/1991 | Janke et al. | |
| 5,012,402 A | 4/1991 | Akiyama | |
| 5,023,770 A | 6/1991 | Siverling | |
| 5,047,959 A | 9/1991 | Phillips et al. | |
| 5,072,356 A | 12/1991 | Watt et al. | |
| 5,072,412 A | 12/1991 | Henderson, Jr. et al. | |

(Continued)

FOREIGN PATENT DOCUMENTS

EP     0 542 657 A1     5/1993

(Continued)

OTHER PUBLICATIONS

Abstract of "Implementing distributed controls for FMC's using Internet utilities," S. S. Jagdale and N. Merchant; Computers of Industrial Engineering, vol. 31, No. 1-2, p. 87-90; Oct. 1996 (UK).

(Continued)

*Primary Examiner*—Bharat Barot

(57) ABSTRACT

A method and apparatus for a notification system for an automation network. The notification system comprises a sensor for monitoring a network device operably connected to the automation network. An intelligent automation device having an object is responsive to the sensor, wherein the intelligent automation device transmits the object to a receiving device for displaying the object to an operator for requesting human intervention with the automation network.

20 Claims, 3 Drawing Sheets

U.S. PATENT DOCUMENTS

| | | | |
|---|---|---|---|
| 5,109,487 | A | 4/1992 | Ohgomori et al. |
| 5,122,948 | A | 6/1992 | Zapolin |
| 5,131,092 | A | 7/1992 | Sackmann et al. |
| 5,134,574 | A | 7/1992 | Beaverstock et al. |
| 5,151,896 | A | 9/1992 | Bowman et al. |
| 5,151,978 | A | 9/1992 | Bronikowski |
| 5,157,595 | A | 10/1992 | Lovrenich |
| 5,159,673 | A | 10/1992 | Sackmann et al. |
| 5,161,211 | A | 11/1992 | Taguchi et al. |
| 5,165,030 | A | 11/1992 | Barker |
| 5,179,700 | A | 1/1993 | Aihara et al. |
| 5,225,974 | A | 7/1993 | Mathews et al. |
| 5,245,704 | A | 9/1993 | Weber et al. |
| 5,251,302 | A | 10/1993 | Weigl et al. |
| 5,283,861 | A | 2/1994 | Dangler et al. |
| 5,297,257 | A | 3/1994 | Struger et al. |
| 5,307,463 | A | 4/1994 | Hyatt et al. |
| 5,321,829 | A | 6/1994 | Zifferer |
| 5,343,469 | A | 8/1994 | Ohshima |
| 5,349,675 | A | 9/1994 | Fitzgerald et al. |
| 5,386,524 | A | 1/1995 | Lary et al. |
| 5,398,336 | A | 3/1995 | Tantry et al. |
| 5,406,473 | A | 4/1995 | Yoshikura et al. |
| 5,420,977 | A | 5/1995 | Sztipanovits et al. |
| 5,430,730 | A | 7/1995 | Sepulveda-Garese et al. |
| 5,440,699 | A | 8/1995 | Farrand et al. |
| 5,446,868 | A | 8/1995 | Gardea et al. |
| 5,471,617 | A | 11/1995 | Farrand et al. |
| 5,528,503 | A | 6/1996 | Moore et al. |
| 5,598,536 | A | 1/1997 | Slaughter, III et al. |
| 5,604,914 | A * | 2/1997 | Kabe ............................ 710/1 |
| 5,611,059 | A | 3/1997 | Benton et al. |
| 5,613,115 | A | 3/1997 | Gihl et al. |
| 5,623,652 | A | 4/1997 | Vora et al. |
| 5,625,781 | A | 4/1997 | Cline et al. |
| 5,699,350 | A | 12/1997 | Kraslavsky |
| 5,734,831 | A | 3/1998 | Sanders |
| 5,793,954 | A | 8/1998 | Baker et al. |
| 5,805,442 | A * | 9/1998 | Crater et al. ................... 700/9 |
| 5,862,391 | A | 1/1999 | Salas et al. |
| 5,944,782 | A * | 8/1999 | Noble et al. ................. 709/202 |
| 5,950,006 | A | 9/1999 | Crater et al. |
| 5,958,009 | A * | 9/1999 | Friedrich et al. ........... 709/224 |
| 5,975,737 | A | 11/1999 | Crater et al. |
| 5,978,850 | A * | 11/1999 | Ramachandran et al. ... 709/223 |
| 5,982,362 | A | 11/1999 | Crater et al. |
| 5,997,167 | A | 12/1999 | Crater et al. |
| 6,016,523 | A | 1/2000 | Zimmerman et al. |
| 6,028,866 | A | 2/2000 | Engel et al. |
| 6,032,203 | A | 2/2000 | Heidhues |
| 6,058,251 | A | 5/2000 | Okamoto et al. |
| 6,061,721 | A | 5/2000 | Ismael et al. |
| 6,104,963 | A * | 8/2000 | Cebasek et al. ............... 700/86 |
| 6,122,670 | A | 9/2000 | Bennett et al. |
| 6,151,640 | A | 11/2000 | Buda et al. |
| 6,199,136 | B1 * | 3/2001 | Shteyn ........................ 710/305 |
| 6,243,746 | B1 * | 6/2001 | Sondur et al. ............... 709/220 |
| 6,247,052 | B1 * | 6/2001 | Huang et al. ................ 709/224 |
| 6,255,943 | B1 * | 7/2001 | Lewis et al. ................. 340/506 |
| 6,263,487 | B1 | 7/2001 | Stripf et al. |
| 6,271,752 | B1 * | 8/2001 | Vaios .......................... 340/541 |
| 6,281,790 | B1 * | 8/2001 | Kimmel et al. .............. 340/506 |
| 6,307,546 | B1 * | 10/2001 | Wickham et al. ............ 345/771 |
| 6,336,137 | B1 * | 1/2002 | Lee et al. ..................... 709/219 |
| 6,349,333 | B1 * | 2/2002 | Panikatt et al. .............. 709/223 |
| 6,356,282 | B2 * | 3/2002 | Roytman et al. ............ 345/736 |
| 6,370,582 | B1 * | 4/2002 | Lim et al. .................... 709/230 |
| 6,389,464 | B1 * | 5/2002 | Krishnamurthy et al. ... 709/220 |
| 6,449,715 | B1 * | 9/2002 | Krivoshein ..................... 713/1 |
| 6,463,446 | B1 * | 10/2002 | Wollrath et al. ............. 707/203 |
| 6,487,581 | B1 * | 11/2002 | Spence et al. ............... 709/203 |
| 6,487,590 | B1 * | 11/2002 | Foley et al. ................. 709/223 |
| 6,522,934 | B1 * | 2/2003 | Irwin et al. .................. 709/203 |
| 6,539,422 | B1 * | 3/2003 | Hunt et al. ................... 709/217 |
| 6,560,611 | B1 * | 5/2003 | Nine et al. ................ 707/104.1 |
| 6,563,430 | B1 * | 5/2003 | Kemink et al. ......... 340/825.49 |
| 6,591,279 | B1 * | 7/2003 | Emens et al. ................ 707/201 |
| 6,631,407 | B1 * | 10/2003 | Mukaiyama et al. ........ 709/223 |
| 6,647,432 | B1 * | 11/2003 | Ahmed et al. ............... 719/318 |
| 6,697,879 | B1 * | 2/2004 | Tufty et al. .................. 719/316 |
| 6,754,664 | B1 * | 6/2004 | Bush ........................... 707/102 |
| 6,782,436 | B1 * | 8/2004 | Baker .......................... 709/245 |
| 7,047,274 | B2 * | 5/2006 | Thomas et al. .............. 709/200 |
| 7,085,814 | B1 * | 8/2006 | Gandhi et al. ............... 709/208 |
| 2001/0033243 | A1 * | 10/2001 | Harris et al. ................. 341/176 |
| 2003/0107588 | A1 * | 6/2003 | Elsbree et al. ............... 345/700 |

FOREIGN PATENT DOCUMENTS

| | | |
|---|---|---|
| EP | 0 814 393 A1 | 12/1997 |
| WO | WO 98/53581 | * 11/1998 |

OTHER PUBLICATIONS

Abstract of "Process control takes to the Net," G. Paula; Mechanical Engineering, vol. 118, No. 12, p. 55, Dec. 1996.

Abstract of "Remote interrogation and control of sensors via the internet," Peter L. Furh and Euan F. Mowat; Sensors, vol. 12, No. 12, 6 pp; Dec. 1995.

Abstract of Implementation of CAN/CAN bridges in distributed environments and performance analysis of bridged CAN systems using SAE benchmark, H. Ekiz, A. Kutlu and E. T. Powner; Conference Paper, IEEE, Southeastern '97, Engineering the new energy, IEEE, p. 185-7, 1996.

Abstract of "Managing interdisciplinary project teams through the Web," R. E. Goodman and P. Chinowsky; Conference Paper, WebbNet 96—World Conference of the Web Society, pp. 180-185, 1996.

Abstract of "Learning environment for a process automation system using computer networks," J. Lindfors, L. Yliniemi and K. Leivska; Conference Paper, Step '96—Genes, Nets and Symbols, pp. 137-143, 1996 (Finland).

Abstract of "Distributed agent systems for intelligent manufacturing;"D. H. Norrie and B. R. Gaines; Canadian Artificial Intelligence, No. 40, p. 31-3, Autumn 1996 (Canada).

Abstract of Proceedings of AUTOFACT 1995 Conference, "Today's Automated, Integrated Factory," Soc. Manuf., Eng., Dearborn, MI; 1995.

RFC 2131 "Dynamic Host configuration Protocol," (http://ietf.org/rfc/rfc21231.txt) IETF, Mar. 1997.

SOAP, Simple Object Access Protocol (1.1) W3C Note May 8, 2000, (http://www.w3.org/TR/2000/NOTE-SOAP-20000508).

Statement of Ken Crater pertaining to awareness of LABTECHnet technology, 1 page.

Walid Mostafa, Mukesh Singhal, "*A Taxonomy of Mulicast Protocols For Internet Applications*," Jul. 18, 1997 from Computer Communications 20 (1998) 1448-1457.

David J. Preston, "*Internet Protocols Migrate to Silicon For Networking Devices*" from Electronic Design, Apr. 14, 1997.

IEEE Std 802.11a-1999 (Supplement to IEEE Std 802.11-1999) "Part 11: Wireless LAN Medium Access Control (MAC) and Physical Layer (PHY) specifications Higher-speed Physical Layer in the 5 GHz Band" [Adopted by ISO/IEC and redesignated as ISO/IEC 8802-11:1999/Amd 1:2000(E)].

P802.1p/D4 Sep. 6, 1966 "P802.1p Standard for Local and Metropolitan Area Networks—Supplemental to Media Access Control (MAC) Bridges: Traffic Class Expediting and Dynamic Multicast Filtering".

PROCOMM Plus—The Leader in terminal emulation, [online], [Retrieved on Jan. 13, 2002]. retrieved from the consumer web page of Symantec, Inc. using Internet <URL:http: //www.symantec.com/procomm>.

DEC Terminals—The DEC VT100 and Its Successors, [online], 1999 Richard Shuford, [retrieved on Jan. 13, 2002]. Retrieved from DEC Video Terminals—The VT100 and Its Successors using Internet <URL:http: //www.cs.utk.edu/~shuford/terminal/dec.html>.

NetReachJ Model TPS-2, TelnetPower Switch 2001, [online], [retrieved on Jan. 13, 2002]. Retrieved from Model TPS-2 Telnet+Dial-Up Remote Power Manager, Remote Reboot of Servers, Route . . . using Internet <URL:http://www.wti.com/tps2.htm>.

ANSI.SYS, [online], [retrieved on Jan. 13, 2002]. Retrieved from ANSI.SYS B ansi terminal emulation escape sequences using Internet URL:http://enterprise.aacc.cc.md.us/~rhs/ansi.html>.

Skonnard, Aaron, SOAP: The Simple Object Access Protocol, [online], [retrieved on Jul. 30, 2002]. Retrieved from SOAP: The Simple Object Access Protocol—MIND Jan. 2000 using Internet <URL: http://www.microsoft.com/Mind/0100/soap/soap.asp>.

Extensible Markup language (XML)—W3C Working Draft Aug. 7, 1997, [online], [retrieved on Aug. 1, 2002]. Retrieved from Extensible Markup Language (XML) website using Internet <URL:http://www.w3.org/TR/WD-xml-970807.htm>.

Abstract of "The ECOSSE Control HyperCourse," C. M. Merrick and J. W. Ponton; Computers & Chemical Engineering, vol. 20, Part B, p. S 1353-8, 1996 (UK).

Abstract of "Chemical-better batch controls," T. Crowl; Control & Instrumentation, vol. 28, No. 5, p. 53-4, May 1996 (UK).

Abstract of "Industrial software does 32-bit Windows, prepares for the net," W. Labs; I 8CS, vol. 69, No. 3, p. 23-6, 31-4, Mar. 1996, USA.

Abstract of "A case study for international remote machining;" G. C. I. Lin and Kao Yung-Chou; Conference Paper, Proc. SPIE-Int. Soc. Opt. Eng., vol. 2620, p. 553-60, 1995.

Abstract of "Standardization of long-distance protocols," R. Dinges; Journal Paper, Generation Changes in Network Conductor Systems, ITG—Fachberichte, vol. 134, p. 97-113, 1995 (West Germany).

Abstract of "Control system design V. Communications orchestrate process control," F. Glow; In Tech, vol. 36, No. 9, p. 65-74, Sep. 1989.

Abstract of "Functions and characteristics of local networks adapted to industrial applications," J. Morlais; Electronique Industrielle, No. 97, p. 56-63, Nov. 15, 1985; France.

Abstract of "Intelligent supervisory control of submerged-arc furnaces," Markus A. Reuter, Carla Pretorius, Chloe West, Peter Dixon and Morne Oosthuizen, JOM vol. 48, No. 12, Dec. 1996, p. 49-51.

Abstract of "Simulation on the integration of process control systems of rolling mill plants through standard networks,"Choo Young Yeol, Hwang Hwa Won and Kim Cheeha, Proceedings of the Industrial Computing Conference, Instrument Society of America, Research Triangle Park, NC, USA. p. 1-14; vol. 6, No. 1, 1996.

Abstract of "Environmental waste control digest," Clayton H. Billings; Public Works vol. 127 No. 7, 6 pp, Jun. 1996.

Abstract of "Experiments in tele-handling and tele machining at the macro and micro scales, using the Internet for operational environment transmission," Mamoru Mitsuishi, Toshio Hori, Tomoharu Hikita, Masao Teratani, Takuro Watanabe, Hirofumi Nakanishi and Bruce Kramer; IEEE International Conference on Intelligent Robots and Systems vol. 2, 1995.

Abstract of "A phototyping and reverse engineering system for mechanical parts-on-demand on the national network," Fred Hansen, Elias Pavlakos, Eric Hoffman, Takeo Kanade, Raj Reddy, Paul Wright; Journal of Manufacturing Systems, vol. 12 No. 4, p. 269-281; 1993.

Abstract of "Mathematical model optimization of furfural treating process," Tao Peng, Jinshou Yu and Huihe Shao; Huadong Huagong Xueyuan Xuebao/Journal of East China Institute of Chemical Technology vol. 17 No. 1, p. 99-104; Feb. 1991.

Abstract of User's Aspect of Telecommunication and Information Processing in Plant Factory; Hashimoto Yasushi (1); Journal of the Institute of Electronics, Information and Communication Engineers; vol. 78, No. 5, p. 475-81, Fig. 3, Ref. 7, 1995. (Japan).

Abstract of "High-efficient application technology of DCS from the viewpoint of users," Oka Norihito (1); Narita Tsutomu (1); (1) Yamatake-Honeywell Co., Ltd.; Otomeshon, vol. 40, No. 2, p. 24-28, Fig. 5, Part 2, 1995. (Japan).

Abstract of "Users' experience with software tools for process integration. General results" Stougie, L.; Roeterink, H.J.H.; Van Wijik, A.; Stikkelman, R.M.; Nov. 1996.

Abstract of "Integrated design and process technology. vol. 1" Cooke, D.; Kraemer, B.J.; Sheu, P.C.Y.; Tsai, J.P.; Mittermeir, R.; Society for Design and Process Science, p. 51-57; 1996. (USA).

Abstract of "Integrated design and process technology. vol. 2" Tanik, M.M.; Bastani, F.B.; Gibson, D.; Fielding, P.J.; Society for Design and Process Science, p. 423-430, 1996. (USA).

Abstract of "Integrated design and process technology. vol. 2" Tanik, M.M.; Bastani, F.B.; Gibson, D.; Fielding, P.J.; Society for Design and Process Science, p. 306-312, 1996.

Abstract of "Need low-cost networking consider DeviceNet," W. H. Moss; InTech vol. 43:11; p. 30-31, Nov. 1996.

"Plastic Car Bodies Pass the Crash Test," mechanical engineering vol. 118, No. 12; Dec. 1996.

http://www.adeptscience.com/archive_pressroom/html/labtechnet.html; Adapt PressRoom Archives. A collection of Adept Scientific's archive news releases. "Hot Coffee on the Internet!".

When Technology Standards Become Counterproductive, Kenneth C. Crater, President, Control Technology Corporation, Hopkinton, MA dated Jul. 9, 1999, pp. 1-5.

A White Paper State Language for Machine Control, Kenneth C. Crater, President, Control Technology Corporation, Hopkinton, MA dated Jul. 9, 1999, pp. 1-11.

New PC-based Process Control & Data Acquisition Software Integrates Remote Internet Capabilities with Fast Pentium Support, Fred A. Putnam, LABTECH President, pp. 1-3.

Aug. 1996 CONTROL Magazine—In The News B Electric Utility Industry Embarks on Automation Overhaul, pp. 1-10.

Jul. 1997 CONTROL Magazine B Magazine Software Review B NT Package Give Plant Access Through the Web, pp. 1-3.

Oct. 1996 CONTROL Magazine B Software Review—Article Archives, pp. 1-2.

ICS Instrumentation & Control Systems B Windows NT for real-time control: Which way to go?—ICS Magazine, pp. 1-8.

I&CS Jul. 1999—Special Report Software—Software: Open source OSs, objects Web-based communications challenge status quo, (Wayne Labs, Senior Technical Editor), pp. 24-49.

Landis & Staefa MS 2000, pp. 1-2.

Landis & Staefa Standards and Open Protocols Integration System Architecture, p. 1.

Annabooks Bookstore, Programming and Interfacing the 8051, by Sencer Yeralan and Asutosh Ahluwalia, pp. 1-2.

SoftPLC Corporation—Java Support in SoftPLC Corp. Products, pp. 1-5.

Mach J. Company, MachJ, an embeddable, clean room Java Virtual Machine, p. 1.

SoftPLC Corporation—The History of Programmable Controllers, Looking Back From the Year 2000 A.D. (Or, How Computers Replaced Proprietary PLC'S), pp. 1-7.

SoftPLC Corporation—TOPDOC: Advanced PLC program development & documentation software, pp. 1-12.

Control Engineering Online Magazine Articles (Jul. 1998)—No, that's not a PC, it's a PLC, pp. 1-2.

Rockwell International Corporation, Allen-Bradley Introduces PLC-5/80E Controller for Ethernet Communication Networks, pp. 1-2.

Rockwell Automation—Search Results, pp. 1-2.

Rockwell International Corporation, Vision & Direction, The Direction of Automation Systems, pp. 1-4.

Rockwell International Corporation, Vision & Direction, The Role of Open Systems, pp. 1-4.

Rockwell International Corporation—Vision & Direction—The Direction of Automation Systems—Emergence of Application-Specific Control Solutions, pp. 1-2.

Rockwell International Corporation—Vision & Direction—The Direction of Automation Systems—The New Factory Worker, pp. 1-2.

Rockwell International Corporation, Vision & Direction, Control System Deliverables—The Next Step, pp. 1-2.

Rockwell International Corporation, Vision & Direction, Conclusion & Acknowledgments, pp. 1-2.

Rockwell International Corporation—Choices—Perspectives on the Future of Automation Control, p. 1.

Rockwell International Corporation—Allen-Bradley—Networks—Ethernet for Industrial Control—An Ethernet White Paper—Apr. 21, 1998, pp. 1-13.

Rockwell International Corporation—Automation Systems Control—General—World-Class Automation Systems from Allen-Bradley, Last Updated: May 7, 1998, pp. 1-12.

PC QUEST, Dec. >97—Point, click, Control—C-Programmable controllers take the pain out of embedded control, pp. 1-2.

Berthel—automation with imagination—PCI 100—Programmable logic controller for SIMATIC/IBM IPC, pp. 1-3.

YAHOO? Personalized Search Results for programmable logic controller internet access, pp. 1-3.

Siemens—Simatic report Jan. 1997—New in the Simatic Library, pp. 1-2.

CONTROL Magazine Aug. 1998 B Field Test—Dynamic Software Makes Control Integration Easier, pp. 1-2.

Design and Reuse Web Site—EDTN Network—Analyze IP Database Content—Analyze Reuse Blocks per taxonomy tree, pp. 1-10.

Using World Wide Web for Control Systems, F. Momal, C. Pinto-Pereira, AT Division CERN, 1211 Geneva 23, http://mish231.cern.ch/Docs/ICALEPCS/1995/icalep95.htm.

"Ethernet Base Gateway Product," AEG-Modicon, published 1991.

"Modicon Modbus Plus Network BM85 Bridge Multiplexer User's Guide," Groupe Schneider, Aug. 1995.

"Modicon Modbus Plus Network Planning and Installation Guide,"AEG Schneider Automation, Apr. 1996.

"Open Modbus/TCP Specification," A. Swales, Sep. 3, 1997.

"MEB Installation and Programming Manual," Niobrara Research and Development Corporation, Sep. 24, 1997.

"MEB-TCP Installation and Programming Manual," Niobrara Research and Development Corporation, Oct. 1, 1997.

"Internet Protocol, Darpa Internet Program, Protocol Specification—RFC:791," Defense Advanced Research Projects Agency, Sep. 1981.

"Transmission Control Protocol, Darpa Internet Program, Protocol Specification—RFC:793," Defense Advanced Research Projects Agency, Sep. 1981.

"[comp.unix.programmer] Unix-Socket-FAQ For Network Programming," Vic Metcalfe, Andrew Gierth and other contributors, Jan 22, 1998.

"TCP/IP Illustrated, vol. 2, The Implementation," Gary R. Wright, W. Richard Stevens, 1997.

Website Information of PROFIBUS: Technical Overview.

Website Information of ODVA—The Open DeviceNet's Vendor Association.

Website of PROFIBUS International—Welcome Page.

LabVIEW Graphical Programming for Instrumentation, Networking Reference Manual, 8 Copyright 1993, 1994 National Instruments Corporation, Part No. 320587B-01, Sep. 1994.

LabVIEW Graphical Programming for Instrumentation, Tutorial for Windows, 8 Copyright 1993, 1994 National Instruments Corporation, Part No. 320593B-01, Sep. 1994.

LabVIEW Graphical Programming for Instrumentation, Data Acquisition VI Reference Manual for Windows, 8 Copyright 1992, 1994 National Instruments Corporation, Part No. 320536B-01, Sep. 1994.

RFC 1533 "DHCP Options and BOOTP Vendor Extensions," (ietf.org/ofc/ofc1533.txt) IETF, Oct. 1993.

Remote Interrogation and Control of Sensors via the Internet, Sensors and Systems; Peter L. Fuhr and Euan F. Mowat; University of Vermont; pp. 25-30; Dec. 1999.

* cited by examiner

METHOD AND SYSTEM FOR TRANSMITTING AND ACTIVATING AN APPLICATION REQUESTING HUMAN INTERVENTION IN AN AUTOMATION NETWORK

TECHNICAL FIELD

The present invention relates to a notification system. More specifically, the present invention relates to a notification system for an automation network.

BACKGROUND OF THE INVENTION

The automation of both complex and simple tasks has improved the output quality of such tasks while also providing operator personnel with the ability to focus on other tasks requiring human intervention. However, some level of human intervention with the automation process is usually required. System bottlenecks occur within the automation process when a response to a request for human intervention is delayed.

Notification applications have been incorporated into automation networks to alert operator personnel that human intervention is needed within the automation process. Some types of notification applications include bells, sirens, speakers, whistles, flashing lights, process suspension or a combination thereof. Generally, these types of alarm applications require operator personnel to be nearby to respond to the alarm and maintain the automation system.

Other notification applications alert remotely located operator personnel to report to the automation network for intervention. These notification applications are triggered by a device monitored on the network. Simple messages such as e-mail are transmitted to notify operator personnel. More sophisticated notification systems initiate function blocks that are written in higher level languages, such a Java, to transmit e-mail for notifying operator personnel. However, the operative Java code is not transmitted to operator personnel. See European patent EP0875023 and German patents DE29600609.2 and DE29622133.3.

Control systems have been integrated with the Internet to facilitate communication between a monitored device and operator personnel. Web access communication is limited because operator personnel or a web browser triggers the communication as opposed to a controller or a monitored device. See U.S. Pat. Nos. 5,805,442, 5,975,737 and 5,982,362.

Although operator personnel do not have to be near the automation network, the number of acceptable remote locations are limited due to the simplistic format of the notification message and/or the limitations and requirements of the message receiver.

The present invention is provided to solve these and other problems.

SUMMARY OF THE INVENTION

The present invention provides a notification system for an automated network wherein an object is transmitted to communicate with operator personnel or any kind of third party software. The object can comprise both data and procedures to manipulate the data. The object is launched when a controller requests intervention by operator personnel.

An embodiment of the present invention is directed to a method of providing notification to an operator of an automation network having an intelligent automation device and a network device located on the automation network. The method comprises the steps of sensing a signal from the network device. An object is transmitted to a receiving device operably connected to the network for notifying the operator, the object being responsive to the signal.

Another embodiment of the present invention is directed to a notification system for an automation network. The notification system comprises an intelligent automation device having an object. Also included in the notification system is a sensor for monitoring a network device on the network. The sensor for monitoring the network device is operably connected to the intelligent automation device, wherein the intelligent automation device transmits the object in response to the sensor. The object is transmitted to a receiving device having means for displaying the object.

Other features and advantages of the invention, which are believed to be novel and nonobvious, will be apparent from the following specification taken in conjunction with the accompanying drawings in which there is shown a preferred embodiment of the invention. Reference is made to the claims for interpreting the full scope of the invention which is not necessarily represented by such embodiment.

DETAILED DESCRIPTION OF THE PREFERRED EMBODIMENT

Figure 1:
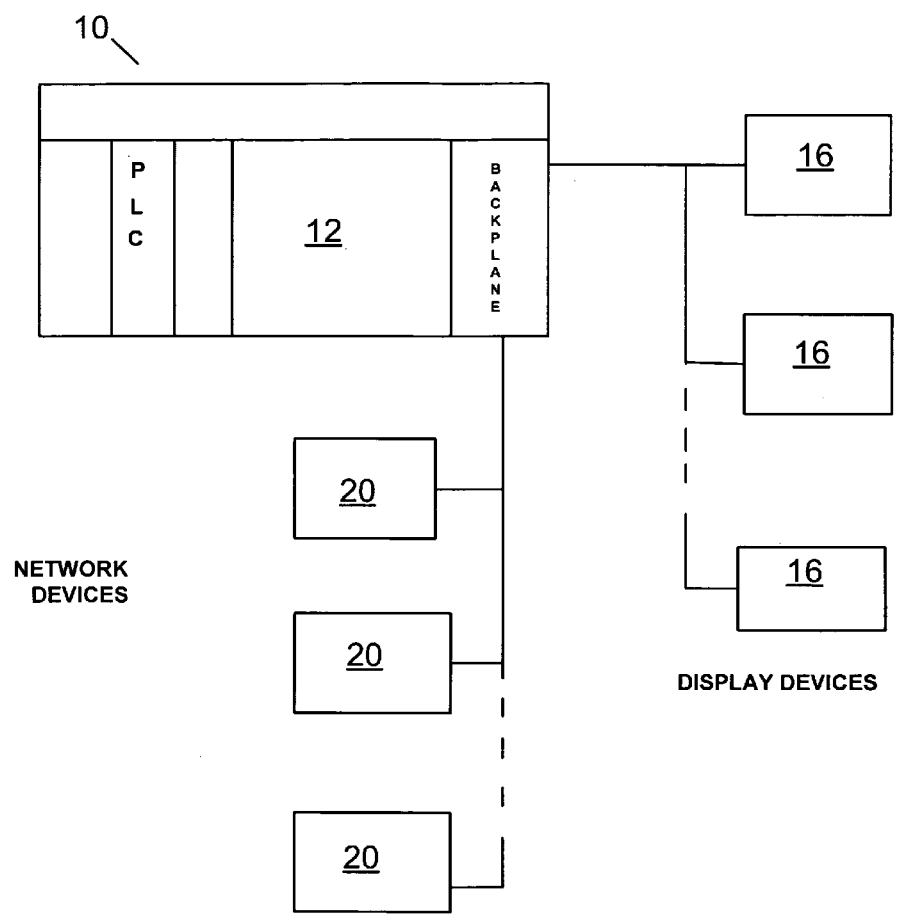
FIG. 1 is an illustration of a block diagram representing the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

This invention is directed to transmitting an object from a function block diagram 11, e.g., International Electrotechnical Commission (IEC) 1131 OFB, DFB, and EFB, etc.; to a receiving or display device 16, such as a monitor, for requesting human intervention with an automation network 10. Specifically, the function block cons an object, preferably a Java-like module, that is transmitted to, and activated at, its destination receiving device 16. The receiving device 16 will launch the Java-like object to notify an operator of a situation affecting the automation network 10. Alternatively, the object can be transmitted to interact with another network or software module.

This invention allows operator personnel to be notified of a network event requesting human intervention without requiring operator personnel to continuously maintain an active alarm handling application for the automation network 10. An object is transmitted by the program application, i.e., function block diagram, of an intelligent automation device 12 to notify and request intervention by an operator. This is useful in alarm applications and when occasional intervention by an operator is required in an automation process. In addition, a programmer can create an object that is integrated within the intelligent automation devices's application program and thus, able to be easily modified at the same time the controller's program is edited. Preferably, the invention is used with a programmable logic controller 12 (PLC), but any other intelligent automation device can be used, i.e., AC-inverter, motion controller, drives, circuit breakers, etc.

In FIG. 1, a function block 14 resides within a controller's application program and is energized or activated through a function block diagram 11. The function block 14 includes an object that is transmitted to a receiving device 16 for notifying operator personnel. The receiving device 16 has means for receiving and displaying the object, e.g., a computer having a web browser.

The object has a defined data type and data structure that includes both data and functions. The object can be a file containing extensible markup language (XML), hyper text markup language (HTML), wireless application protocol (WAP) or WML (an XML application) that is specifically devised for small screens and navigation without a keyboard. WML is found on devices such as smart phones and communicators with simple mail transfer protocol (SMTP), or Java code. Some object oriented programming languages are Java, C++ and Smalltalk.

Figure 3:
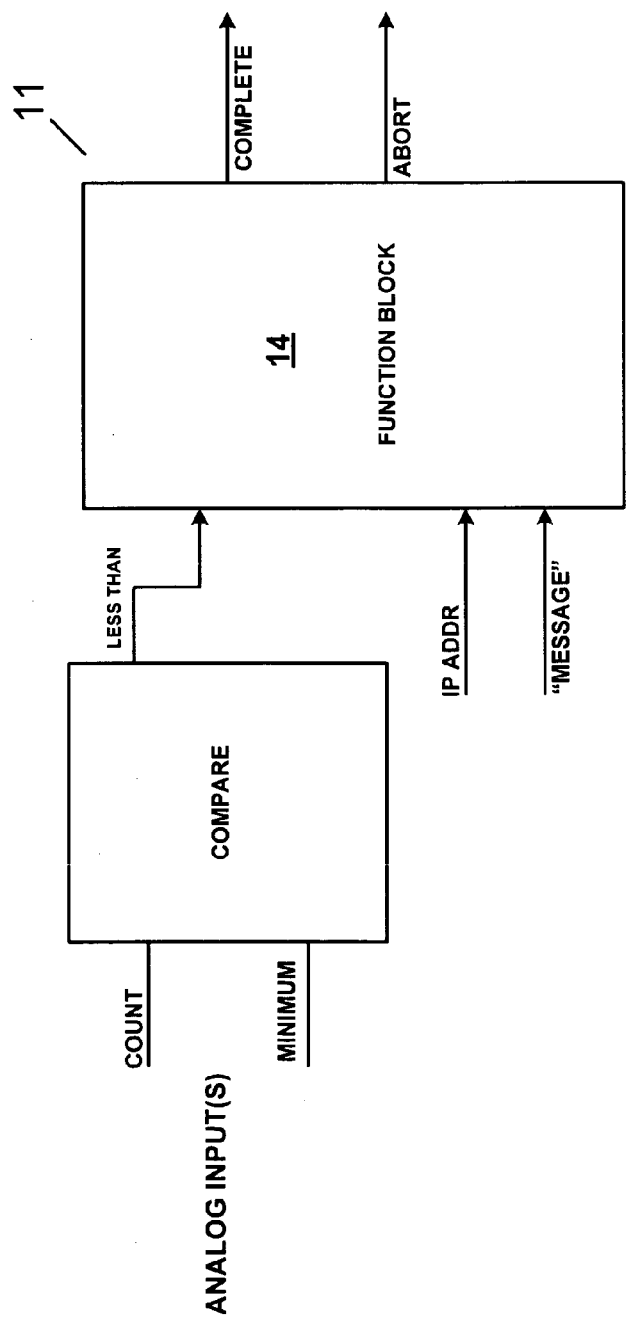

FIG. 3 is an illustration of a block diagram representing a portion of the function block diagram 11. An input from a network device (not shown) on the network is monitored, preferably through polling, by sensing a signal from the network device. In response to the signal from the network device 20, the function block 14 can transmit an object containing a Java-like code to the display device 16. An agent residing at the display device 16 can be activated to display the object to request intervention by an operator. In another embodiment of the invention, the object activates the agent on the display device 16.

Upon receipt of a Java, HTML or WML based object, the receiving device 16 stores the object in a temporary location of the receiving device 16. The receiving device 16 displays the object for notification to an operator. Preferably, a web browser displays an image on the screen of the receiving device 16. However, it is to be understood that audible notification or any other type of sensory notification to the receiving device 16 is also contemplated by this invention. If the intervention request is transmitted by a network device 20 in Java, HTML or WML, the receiving device 16 displays a graphic image related to the network device 20 that initiated the controller's request for intervention. The receiving device 16 then waits for the operator personnel to intervene. If desired, an operator can send a message response back to the function block 14, EFB, through the receiving device 16. The function block diagram waits for a message response from the receiving device 16. The response can close the connection or abort it by setting a bit or flag within the function block 14. If the operator transmits a return message, the information is placed in a location specified by the function block diagram 11.

Other messages having different protocols can also be sent to various other receiving devices 16; such as XML to computers; WML to cell phones; wireless application protocol (WAP) to mobile phones, pagers, two-way radios, smartphones and communicators; hyper text markup language (HTML) to web browsers; simple mail transfer protocol (SMTP) to electronic mail boxes, etc. In addition, a handheld device such as a personal digital assistant (PDA) that combines computing, telephone/fax, and networking features can also be used as a receiving device 16. A PDA can function as a cellular phone, fax, and personal organizer. Unlike portable computers, most PDAs are pen-based, using a stylus rather than a keyboard for input. PDAs can incorporate handwriting recognition features and some PDAs can also react to voice input by using voice recognition technologies. Thus, operator personal can provide a written or oral response to the controller 12 requesting intervention.

Figure 2:
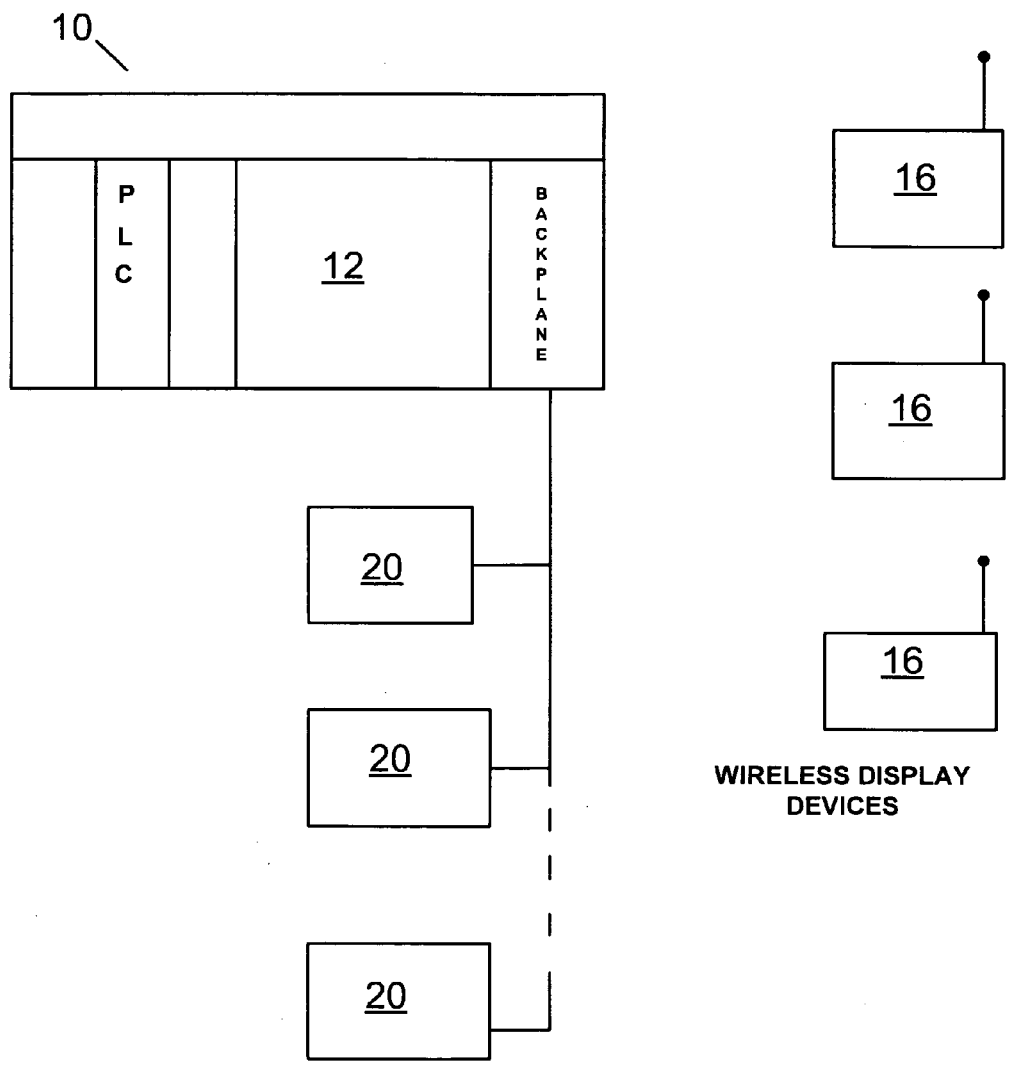
FIG. 2 is an illustration of a block diagram representing an alternative embodiment of the present invention and, FIG. 3 is an illustration of a block diagram representing a portion of the function block diagram.

FIG. 2 represents an alternate embodiment of the present invention wherein transmission of an object to the receiving device 16 is wireless. A receiving device 16 having an agent, preferably a computer with a browser, monitors network events on a predetermined port. A function block code 14 i.e., EBD, EFB, OFB, is energized through a function block diagram 11 and connects to the agent at a predetermined receiving device 16, e.g., computer, pager, cell phone, etc. The function block 14 sends the object to the agent or an other server, such as a SMTP server. The object can contain any markup language, e.g., XML, HTML, WML or Java code. If the object contains SMTP, the object is e-mailed without awaiting a reply from the receiving device 16. The agent initiates a web browser on the receiving device 16 if the message is Java, HTML, XML or WML.

The object executes at the receiving device 16, perhaps displaying a graphic image of a network device 20 that requires attention. The browser waits for operator personnel to intervene. If an operator enters a response message, the response message is sent back to the function block 14 wherein the controller 12 can act in accordance with the response message. The message response is placed in a location specified by the function block 14.

While specific embodiments have been illustrated and described, numerous modifications come to mind without significantly departing from the spirit of the invention and the scope of protection is only limited by the scope of the accompanying claims.

We claim:

1. A method of providing notification to an operator of an automation network having an intelligent automation device and a network device located on the automation network, the method comprising the steps of:
   monitoring the network device by said intelligent automation device;
   sensing a signal within said intelligent automation device, said signal received from the network device;
   transmitting an object module human-machine interface application including data and functions from said intelligent automation device to a receiving device operably connected to the automation network; and,
   activating the object module human-machine interface application at the receiving device for notifying the operator of an event and requesting human intervention, the object module human-machine interface application being responsive to the signal.

2. The method of claim 1 wherein the receiving device comprises means for displaying the object module human-machine interface application.

3. The method of claim 2 wherein the means for displaying the object module human-machine interface application is a web browser.

4. The method of claim 3 wherein the object module human-machine interface application is a Java program.

5. The method of claim 1 wherein the intelligent automation device is a programmable logic controller.

6. The method of claim 1 further including transmitting a response to the intelligent automation device from the receiving device.

7. A notification system for an automation network having a network device located on the automation network, the notification system comprising:

a sensor for monitoring the network device, the sensor being operably connected to the automation network;

an intelligent automation device operably connected and responsive to the sensor, the intelligent automation device having an object module human-machine interface application having data and functions; and, a receiving device operably connected to the automation network, wherein the intelligent automation device is configured to transmit the object module human-machine interface application to the receiving device to notify the operator of an event requesting human intervention in response to the sensor and wherein the receiving device is configured to activate the object module human machine interface application.

8. The notification system of claim 7 wherein the receiving device comprises a software module to interact with the intelligent automation device.

9. The notification system of claim 7 wherein the receiving device has means for displaying the object module human-machine interface application.

10. The notification system of claim 9 wherein the means for displaying comprises a web browser.

11. The notification system of claim 10 wherein the object module human-machine interface application is a Java program.

12. The notification system of claim 7 wherein the intelligent automation device is a programmable logic controller.

13. The notification system of claim 7 wherein the object module human-machine interface application is an extensible markup language (XML).

14. The notification system of claim 7 wherein the object module human-machine interface application is a wireless application protocol (WAP).

15. The notification system of claim 7 wherein the object module human-machine interface application is a hyper text markup language (HTML).

16. The notification system of claim 7 wherein the object module human-machine interface application is a WML language.

17. A notification system for an automation network having an intelligent automation device responsive to a network device located on the automation network, the notification system comprising:

an object module human-machine interface application including data and functions for requesting human intervention with the automation network embedded in the intelligent automation device, the object module human-machine interface application responsive to a signal from a network device; and, a receiving device operably connected to the intelligent automation device, wherein the intelligent automation device is configured to transmit the object module human-machine interface application to the receiving device and wherein the receiving device is configured to activate the object module human machine interface application.

18. The notification system of claim 17 wherein the receiving device comprises a software module to interact with the intelligent automation device.

19. The notification system of claim 17 wherein the receiving device has means for displaying the object module human-machine interface application.

20. The notification system of claim 19 wherein the intelligent automation device is a programmable logic controller.

* * * * *